April 5, 1949.  N. WYETH  2,466,345
CONTROL FOR SEAT STRUCTURE
Filed May 23, 1945
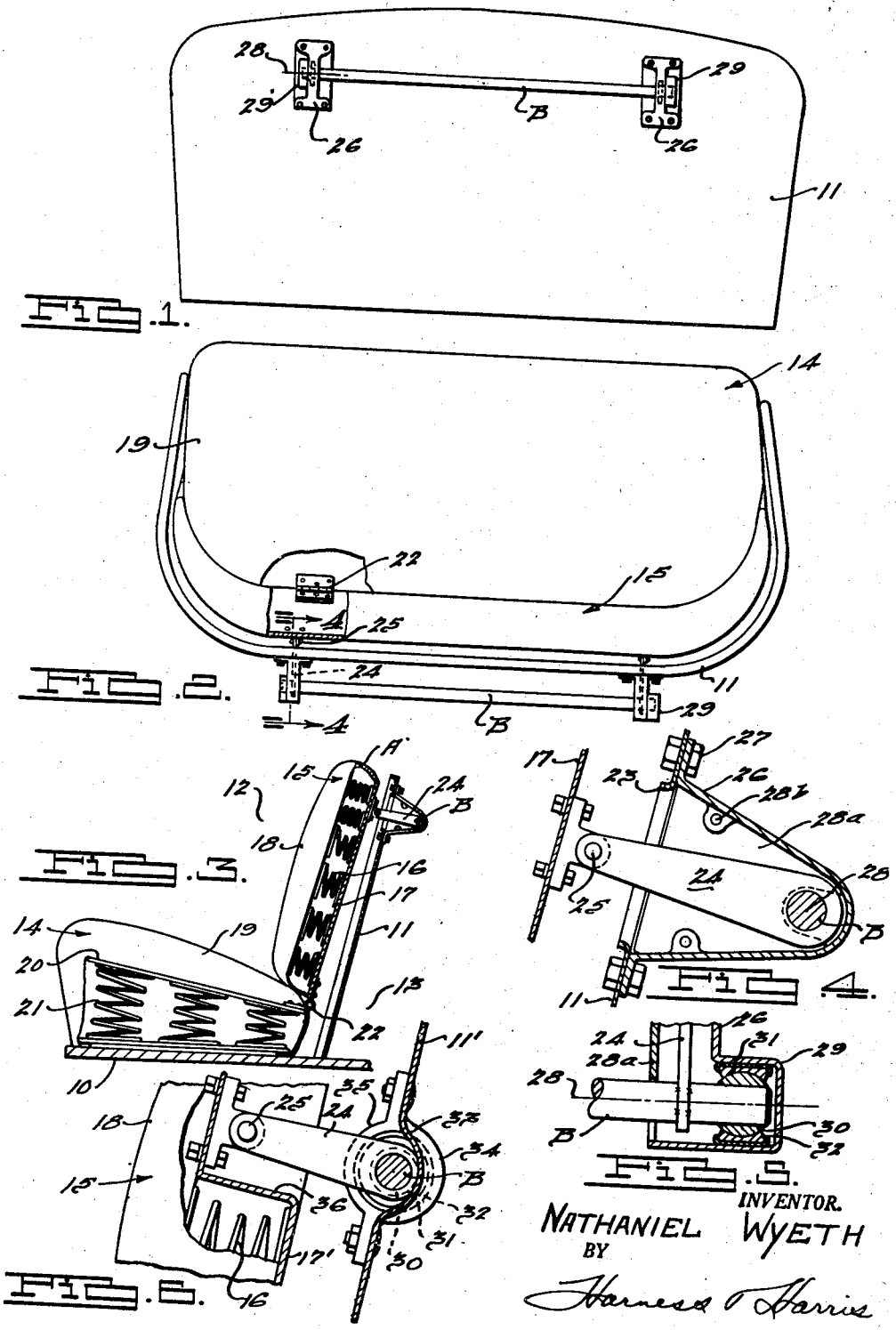
INVENTOR.
NATHANIEL WYETH
BY
Harness & Harris
ATTORNEYS Patented Apr. 5, 1949

2,466,345

UNITED STATES PATENT OFFICE 2,466,345

CONTROL FOR SEAT STRUCTURE

Nathaniel Wyeth, Detroit, Mich., assignor to Chrysler Corporation, Highland Park, Mich., a corporation of Delaware Application May 23, 1945, Serial No. 595,268

6 Claims. (Cl. 296—63)

This invention relates to control for seat structures and refers more particularly to improvements in the suspension and control of seats employed in motor vehicles.

It is customary in motor vehicles to provide a driver's seat sprung on a supporting floor structure and extending substantially the width of the driver's compartment so that several passengers, in addition to the driver, may occupy the seat. However, when one end portion of the seat is loaded more than the other end portion as, for example, when the driver alone occupies the seat, the seat is tilted laterally of the vehicle by reason of its deflection on its sprung support more to the loaded end than to the unloaded end. This is not only unsightly but results in objectionable action of the seat when vibrations are set up in the sprung support as when the vehicle travels over a rough road.

In addition, when the seat back is tied with the seat then the foregoing objectionable characteristics are aggravated. It is advantageous to connect the seat and seat back to each other in order to minimize the scrubbing action of the seat back on the back of the driver when he moves up and down on the seat when the vehicle is travelling over rough roads. Heretofore, the driver was subjected to fatiguing and unpleasant pitching often interfering seriously with his control of the motor vehicle because of the undamped vibrations of the seat, such conditions being aggravated when the seat and seat back are tilted due to non-uniform loading.

It is an object of my invention to overcome the foregoing objections by providing a control for the seat such that the seat, and the seat back as well when connected to the seat, are maintained substantially level or non-tilting even when the seat is non-uniformly loaded as when only the driver occupies the seat.

A further object is to provide a novel means for damping vibrations of the seat. While my damping means may be employed to damp vibrations of either a seat or seat back, I preferably connect these seat portions together such that the resulting unit is damped. Such arrangement minimizes fatigue, scrubbing action of the seat back on the back of the driver, and unpleasant pitching and bouncing of the driver as well as other occupants of the seat.

Another object of my invention is to provide a combination robe rail and stabilizer control for a seat or seat back or both. In its more limited aspects, my invention contemplates the employment of a stabilizer bar for tilt control and I have so arranged this bar that it may serve the purpose of a robe rail often carried at the rear of the front seat for the convenience of the occupants of the rear compartment of the vehicle. However, if desired, the stabilizer bar may be concealed and otherwise so located as not to project into the rear compartment.

Further objects and advantages of my invention will be more apparent from the following description of several embodiments of the principles of my invention, reference being made to the accompanying drawing in which:

Fig. 1 is an elevational view looking forwardly of the vehicle at the false back of the front seat structure.

Fig. 2 is a top plan view of the front seat structure and associated control.

Fig. 3 is a side elevational view of the Fig. 2 structure with parts broken away to illustrate the seat structure and control parts.

Fig. 4 is a detail sectional elevational view taken as indicated by line 4—4 of Fig. 2.

Fig. 5 is a detail sectional plan view illustrating one of the supports for the stabilizer bar.

Fig. 6 is a fragmentary sectional elevational view generally similar to Fig. 4 but illustrating a modification of my invention.

In the drawings the motor vehicle includes a supporting structure comprising the usual floor portion 10 and an upright false back structure 11 which defines a forward driver and passenger compartment 12 and a rearward passenger compartment 13.

The front seat structure A comprises a load-receiving seat portion 14 and a back portion 15 the latter comprising springs 16 disposed between a rear frame 17 and a cushion 18. The seat portion 14 comprises a cushion 19 carried by a frame 20 which in turn is mounted by springs 21 on the floor 10. The seat 14 and back 15 are tied together as by the hinges 22 pivotally connecting the frame parts 20 and 17 so that the seat and back vibrate as a unit substantially vertically on the spring support 21.

The supporting structure or false back 11 is provided adjacent opposite end portions thereof with an opening 23 to receive a link 24 pivotally connected at 28 to the structure 11 adjacent the top thereof, each link extending rearwardly for fixed attachment, as by welding, to an end portion of a transversely extending torsion stabilizer rod or bar B. Each opening 23 is closed by a bracket housing 26 attached at 27 to the support 11 and shaped to accommodate oscillation of its associated link 24 about the axis 28 of rod B. A side cover plate 28ᵃ is secured at 28ᵇ to the housing 26 after the bar B has been assembled.

The stabilizer rod B has each of its end portions rotatably supported in a hollow cylindrical lateral extension portion 29 of a bracket 26, intermediate portions of rod B between the brackets 26 being thus spaced rearwardly from support 11 to function as a robe rail for the convenience of the passengers in the rear compartment 13, the limited oscillation of rod B not interfering with such function.

One of the rod supports in the housing portion 29 is illustrated in Fig. 5 and preferably comprises a ball and socket type of support one member of which, such as the ball part 30, being fixed with rod B and the socket part 31 being fixed through its housing 32 with the portion 29. At some convenient point or points in the vibratory seat unit and control system, I provide means for damping the vibrations and in the present embodiment of my invention this means is incorporated in each of the pivotal supports for rod B as follows.

One of the ball and socket parts, preferably the socket part 31, is formed of known non-metallic bearing composition such that when the parts are assembled as in Fig. 5 a predetermined pressure occurs between parts 30 and 31. This results in frictional resistance to rotation of rod B and damps oscillation of the rod about its axis and also damps vibration of the seat 14 and back 15 by reason of the interconnection of these parts with the rod B.

In operation, when the seat 14 is uniformly loaded, as when it is occupied by two persons of about the same weight, then the seat 14 and back 15 deflect substantially vertically and vibrate up and down on springs 21 as a unit and without tilt in the seat or back, the rod B oscillating by reason of the connection through links 24 without torsionally loading the rod. However, the vibrations will be damped by the friction pivot supports for the rod at the ball and socket 30, 31. This damping action snubs out the vibrations and brings the parts to rest without unduly prolonged vibrations of the seat and back. The pivot connection 22 causes the back 15 to move up and down with seat 14 thus preventing a scrubbing effect on the backs of the occupants.

When the seat 14 is loaded non-uniformly, then tendency of the seat to tilt is substantially overcome by the action of the stabilizer bar B. Thus, when only the driver occupies the seat 14, the seat is deflected downwardly causing the back 15 to move downwardly and operating through the link 24, located behind the driver, to torsionally twist rod B about its axis thereby effecting corresponding movement of the other link and corresponding deflection of the other end portion of the seat and back. Furthermore, vibrations of the seat and back are likewise transmitted through rod B accompanied by damping action at the sockets 31 such that the seat frame 20 and the back 15 are maintained on the same level relative to the floor 10.

In the Fig. 6 modification the stabilizer bar B is now located forwardly of compartment 13 concealed in front of support 11', the latter in this instance being deflected rearwardly at 33 to accommodate the links 24 and bar B and at 34 to house the ball and socket supports in conjunction with cap 35. Inasmuch as it is advantageous to employ relatively long links 24, I have provided a recess 36 in the back frame 17' at each link to receive the forward ends of the links at pivots 25. Otherwise the construction is identical with that aforesaid and the operation is likewise identical with the exception that the Fig. 6 bar is now not employed as a robe rail.

It will be understood that upholstery fabric (not shown) will ordinarily be employed to cover the false back 11 at its rear face as well as the supports for rod B and the rod enclosure 33 in the Fig. 6 arrangement.

I claim:

1. In a motor vehicle seat structure, the combination of a supporting structure having substantially horizontal and a substantially vertical portions, a seat comprising a load-receiving structure springingly supported by said supporting structure for substantially vertical deflection, a seat back located in proximity with said vertical portion, means operably connecting said load-receiving structure with said seat back for moving the latter generally vertically in response to vertical deflection of said load-receiving structure, a stabilizer bar located on the opposite side of said vertical portion from said seat back and in a horizontal plane spaced from said vertical portion, said stabilizer bar thus being adapted to serve as a robe rail and said stabilizer bar being rotatably supported by said vertical portion of said supporting structure, and means connecting opposite end portions of said bar to said seat back so constructed and arranged as to impart rotation to said bar in response to said vertical movement of said seat back.

2. In a motor vehicle seat structure, the combination of a supporting structure having substantially horizontal and a substantially vertical portions, a seat comprising a load-receiving structure springingly supported by said supporting structure for substantially vertical deflection, a seat back located in proximity with said vertical portion, means operably connecting said load-receiving structure with said seat back for moving the latter generally vertically in response to vertical deflection of said load-receiving structure, a stabilizer bar located on the opposite side of said vertical portion from said seat back and in a horizontal plane spaced from said vertical portion, said stabilizer bar thus being adapted to serve as a robe rail and said stabilizer bar being supported on said supporting structure for rotation about the longitudinal axis of said bar, and means pivotally connecting opposite end portions of said bar to the respective opposite end portions of said seat back so constructed and arranged as to impart rotation to said bar about said axis in response to said vertical movement of said seat back thereby to effect, in cooperation with said connecting means between said seat back and said load-receiving structure of said seat, substantially uniform deflection of said seat back and said load-receiving structure of said seat when the latter is loaded more toward one of its end portions than the other.

3. In a motor vehicle seat structure, the combination of a supporting structure having substantially horizontal and a substantially vertical portions, a seat comprising a load-receiving structure springingly supported by said supporting structure for substantially vertical deflection, a seat back located in proximity with said vertical portion, means operably connecting said load-receiving structure with said seat back for moving the latter generally vertically in response to vertical deflection of said load-receiving structure, a stabilizer bar located on the opposite side of said vertical portion from said seat back and in a horizontal plane spaced from said vertical portion, said stabilizer bar thus being adapted to serve as a robe rail and said stabilizer bar being rotatably supported by said supporting structure, and means for imparting rotation to said bar in response to said vertical movement of said seat back comprising a pair of links spaced from each other and each fixed at one end to an end portion of said bar and having its other end pivotally connected to said seat back.

4. In a motor vehicle seat structure, the combination of a supporting structure having substantially horizontal and a substantially vertical portions, a seat comprising a load-receiving structure springingly supported by said supporting structure for substantially vertical deflection, a seat back located in proximity with said vertical portion, means operably connecting said load-receiving structure with said seat back for moving the latter generally vertically in response to vertical deflection of said load-receiving structure, a stabilizer bar located on the opposite side of said vertical portion from said seat back and in a horizontal plane spacer from said vertical portion, said stabilizer bar thus being adapted to serve as a robe rail and said stabilizer bar being supported for rotation about the longitudinal axis of said bar, and means for imparting rotation to said bar about said axis in response to said vertical movement of said seat back thereby to effect, in cooperation with said connecting means between said seat back and said load-receiving structure of said seat, substantially uniform deflection of said seat back and said load-receiving structure of said seat when the latter is loaded more toward one of its end portions than the other, said bar rotating means comprising a pair of links spaced from each other and each fixed at one end to an end portion of said bar and having its other end pivotally connected to said seat back.

5. In a vehicle seat structure, the combination of a supporting structure including a base portion and an upright false back portion, a seat comprising a load-receiving portion and a seat back portion, means connecting said portions with one another to provide a substantially vertically deflectible unit, means springingly supporting said unit on said base portion on one side of said false back portion, a horizontal torsion bar rotatably mounted on the other side of said false back portion in spaced relationship thereto and adapted to serve as a robe rail, and means operably connecting said bar to opposite end portions of said seat back portion.

6. In a motor vehicle, the combination of a supporting structure including an upright false back structure defining forward and rearward passenger compartments, a seat structure in said forward compartment, means springingly supporting said seat structure on said supporting structure, a robe rail, means rotatably supporting said rail on said false back structure such that intermediate portions of said rail are spaced rearwardly of the vehicle from said false back structure, and means operably connecting opposite end portions of said rail to opposite end portions respectively of said seat structure whereby to effect rotation of said rail in response to deflection of said seat structure on its springing support means.

NATHANIEL WYETH.

REFERENCES CITED

The following references are of record in the file of this patent:

UNITED STATES PATENTS

| Number | Name | Date |
| --- | --- | --- |
| 1,171,297 | Adams | Feb. 8, 1916 |
| 1,267,792 | Oliver | May 28, 1918 |
| 1,467,645 | McPherson | Sept. 11, 1923 |
| 1,742,540 | Hilburger | Jan. 7, 1930 |
| 2,073,872 | Kliesrath | Mar. 16, 1937 |
| 2,357,825 | Hickman et al. | Sept. 12, 1944 |
| 2,366,730 | Hickman | Jan. 9, 1945 |

Certificate of Correction

Patent No. 2,466,345. April 5, 1949.

NATHANIEL WYETH

It is hereby certified that error appears in the printed specification of the above numbered patent requiring correction as follows:

Column 5, line 25, claim 4, for the word "spacer" read *spaced*;

and that the said Letters Patent should be read with this correction therein that the same may conform to the record of the case in the Patent Office.

Signed and sealed this 6th day of September, A. D. 1949.

[SEAL]

THOMAS F. MURPHY,
*Assistant Commissioner of Patents.*